United States Patent
Stracke et al.

(10) Patent No.: US 6,428,241 B1
(45) Date of Patent: Aug. 6, 2002

(54) SUBSEA PIG LAUNCHER

(75) Inventors: Peter Stracke; William Clegg, both of Houston; Michael Cunningham, Plantersville, all of TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 09/498,560

(22) Filed: Feb. 4, 2000

(51) Int. Cl.[7] .................................................. F16L 1/00
(52) U.S. Cl. .................................................... 405/184.1
(58) Field of Search ............................. 405/184.1, 158; 15/104.061, 104.062; 137/268; 134/8

(56) References Cited

U.S. PATENT DOCUMENTS

| | | | |
|---|---|---|---|
| 3,667,359 A | * 6/1972 | Watts et al. | ............. 95/11 HC |
| 3,758,050 A | * 9/1973 | Watts et al. | .................. 243/32 |
| 4,155,669 A | 5/1979 | Rochelle | |
| 4,314,577 A | * 2/1982 | Brister | ......................... 137/13 |
| 4,401,133 A | 8/1983 | Lankston | |
| 4,676,310 A | 6/1987 | Scherbatskoy et al. | |
| 4,709,719 A | * 12/1987 | Littleton et al. | ............ 137/268 |
| 5,139,576 A | * 8/1992 | Davis | ............................. 134/8 |
| 5,186,757 A | * 2/1993 | Abney, Sr. | ...................... 134/8 |
| 5,219,244 A | 6/1993 | Skeels | |
| 5,873,139 A | 2/1999 | Goth | |
| 5,884,656 A | * 3/1999 | Smith | .......................... 137/268 |
| 6,022,421 A | 2/2000 | Bath et al. | |
| 6,170,493 B1 | 1/2001 | Sivacoe | |

* cited by examiner

Primary Examiner—Thomas B. Will
Assistant Examiner—Raymond Addie
(74) Attorney, Agent, or Firm—Duane Morris LLP

(57) ABSTRACT

A subsea pig launcher, that can launch either 1 or more pipeline pigs simultaneously. The pig launcher can be assembled on a subseas production pipeline with the aid of an ROV. In the preferred embodiment, the pigs are connected to each other and spaced apart by a spine. The pig launcher is configured to capture the next pig to be launched in such a manner that the spine behind it is in alignment with a shearing valve; for example, coiled tubing or wireline. Sequential valve operation shears the spine and applies pressure behind the pig to launch it from the launcher past the pig detector and onto a platform for recapture.

16 Claims, 2 Drawing Sheets

SUBSEA PIG LAUNCHER

FIELD OF THE INVENTION

The field of this invention relates to launching devices and more particularly to subsea pipeline pig launching devices.

BACKGROUND OF THE INVENTION

Pipelines are frequently cleaned by launching objects into them and propelling those objects under pressure to a different point in the pipeline where the object known as a pig is captured. Pig launchers used in the past have been built sufficiently large to enclose several pigs which can be launched in sequence. One of the problems in the designs used in the past involving multiple pigs in a launcher is that they jam up against each other, precluding any pigs from being launched at all. Other devices have involved loading multiple pigs in a circular layout in a rotating barrel and sequentially aligning pigs with the launch outlet for ultimate release. These devices have also proven to be large and cumbersome and have required significant maintenance to ensure proper operation. Additionally, due to misalignment upon rotation of the cylinder with the launch passage, the pigs could also stick in such designs, thus requiring an overhaul of the pig launcher. Typical examples of pig launchers used in the past can be found in U.S. Pat. Nos. 5,873,139; 5,219,244; 4,709,719; and 4,401,133.

In the past multiple pig launchers have used spheres. Undirectional pigs such as bullet or cylindrical shapes or those that have multiple cup shaped bushings have been launched one at a time from housings. An object of the present invention is to launch a series of such undirectional pigs from a common housing.

What has been lacking in the previous designs is a simple, uncomplicated pig launching device which is capable of sequentially launching multiple pigs in a reliable manner. Additionally, what is also desirable, and is an objective of the present invention, is to configure the pig launcher components so that they can be assembled subsea by a remotely operated vehicle (ROV). Another object of the invention is to be able to use an ROV to install a multiple pig launcher subsea remotely from a platform and to retrieve the pigs onto the platformn. Those and other objects of the present invention will become more apparent to those skilled in the art from a review of the detailed description of the preferred embodiment below.

SUMMARY OF THE INVENTION

A multiple pig subsea pig launcher is disclosed. The pig launcher can be assembled on a production pipeline subsea with the aid of an ROV. In the preferred embodiment, the pigs are connected to each other and spaced apart by a spine. The pig launcher is configured to capture the next pig to be launched in such a manner that the spine behind it is in alignment with a shearing valve; for example, coiled tubing or wireline. Sequential valve operation shears the spine and applies pressure behind the pig to launch it from the launcher past the pig detector and onto a platform for recapture.

DETAILED DESCRIPTION OF THE DRAWINGS

DETAILED DESCRIPTION OF THE PREFERRED EMBODIMENT

Figure 1:
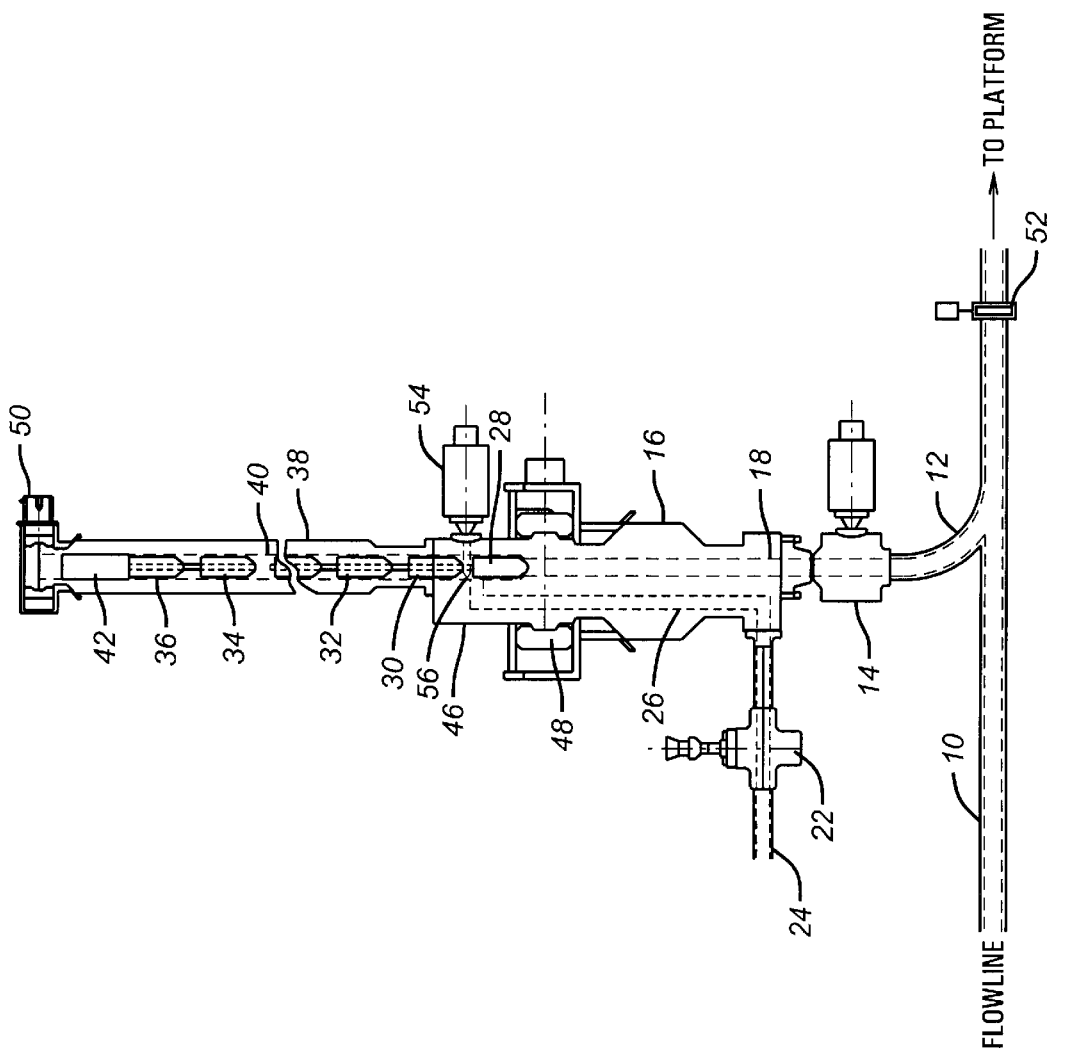
FIG. 1 is a sectional elevational view of the pig launcher prior to launching of the next pig.

Referring to FIG. 1, a flow line 10 has a branch 12 to which is attached an outlet valve 14. Mounted above the outlet valve 14 is the pig launcher body 16. Body 16 has passage 18 extending through it. Passage 18 has a reducing taper 20, better seen in FIG. 2. Connected to body 16 is a valve 22, which is connected to a pressure supply source shown schematically as pipe 24. A passage 26 communicates above the next pig to be launched 28. Mounted above pig 28 are pigs 30, 32, 34, and 36. Those skilled in the art will appreciate that greater or fewer pigs can be used without departing from the spirit of the invention. The pigs such as 28 are loaded into a receptacle 38 which has an internal passage 40 extending therethrough. A weight 42 can be placed above the top-most pig 36 to urge the assembly of the pigs downwardly, as will be described below. The pigs 28 through 36 are physically interconnected and spaced apart at a predetermined distance by a spine 44, which runs through all of them. The spine is preferably centered in the pigs, and it needs to be sufficiently rigid so as to avoid buckling under normal use within the receptacle 38, and during normal handling until loaded into the passage 40. It should also be sufficiently flexible to avoid damaging the pipeline as it trails behind a launched pig 28. As shown in FIG. 1, the body 16 has a top cap 46, which is secured to the balance of the body 16 by a connector 48. Connector 48 can be of a type that grabs two opposed flanges and holds them together as illustrated in FIG. 1. In the preferred embodiment, the connector is of the type which can be easily assembled or disassembled with an ROV. Accordingly, the lower portion of body 16 can be left in place subsea and the cap 46, along with the receptacle 38, loaded with pigs 28 through 36 can all be assembled with an ROV. At the top of the receptacle 38 is a cap 50, which is also of a design which is adapted to be removed by an ROV. Accordingly, an ROV can be used not only to install the equipment shown in FIG. 1 as described above, but it can also be used to reload pigs into passage 40 for further launches. A pig detector 52 is of a type well known in the art and is installed in the flow line 10 downstream of branch 12 so that when a pig goes by it, a signal is given either locally at the detector 52 or at the surface.

Figure 2:
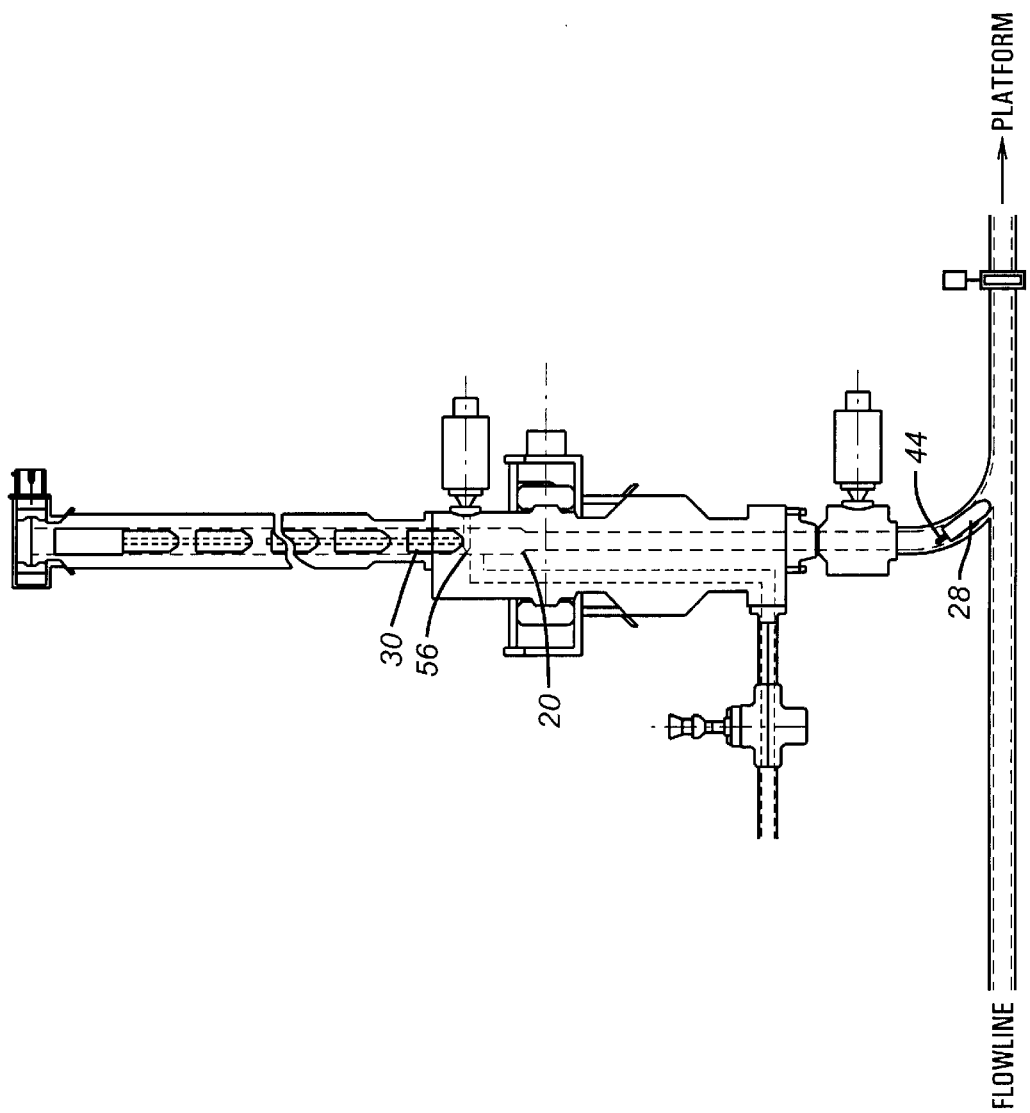
FIG. 2 is the view of FIG. 1 after the next pig has been launched.

In FIG. 1, it is clear to see that initial opening of inlet valve 54 allows the pig 28 to fall downwardly until it is captured by the reduction taper 20 in passage 18. The pig 28 is of a predetermined length to expose a portion of the spine 44 in alignment with a cutter 56 which is operated by stroking the inlet valve 54. Valve 54 is a well known design typically used in subsea Christmas trees and their associated running tools and has the ability of delivering a sufficient force to the cutter 56 to cut typical wirelines in emergency situations. In the application shown in FIG. 1, actuation of valve 54 severs a portion of the spine 44 in the situation of FIG. 1 between pigs 28 and 30. With the spine 44 severed between pigs 28 and 30, valve 22 is actuated to open to provide a pressure source and valve 14 is open to allow escape of the pig 28 as shown in FIG. 2. FIG. 2 illustrates a portion of the cut spine 44 which travels with pig 28. At the instant of time that is depicted in FIG. 2, the next pig 30 is sitting on top of cutter 56, which remains in the stroked closed position. In FIG. 1, the cutter 56 is shown in a retracted position. Upon a reopening of valve 54, the weight 42 will push down the assembly of the remaining pigs which are still interconnected with a spine 44 until the reduction taper 20 stops forward movement of all pigs with a portion of the spine 44 again perfectly aligned with the cutter 56 for repetition of the process described above.

Figure 3:
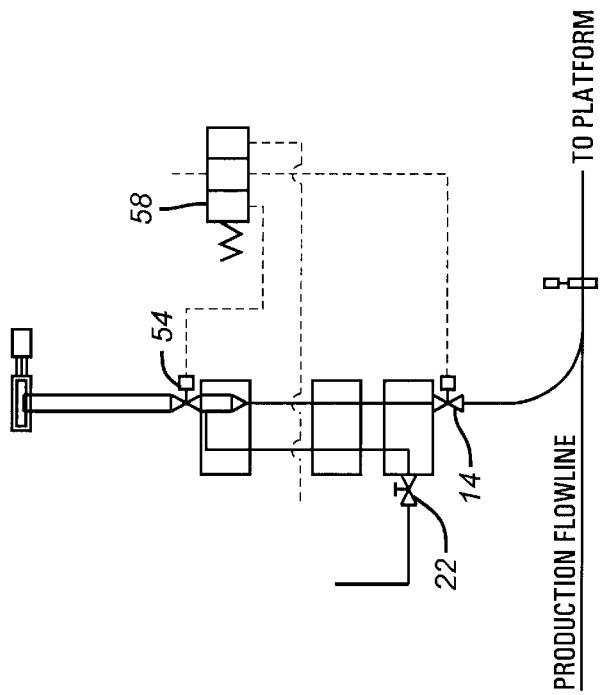
FIG. 3 is a schematic of the controls which can be used to operate the pig launcher of the present invention.

FIG. 3 is a schematic representation indicating the use of a sequence controller 58 to regulate the operation of valves 13, 22 and 54. The sequence of movements has been previously described.

Those skilled in the art will appreciate that the configuration of the subsea pig launcher illustrated in FIG. 1 allows for easy assembly by an ROV and permits reliable operation of sequential launches of pigs from a given housing 38. The pigs can all be loaded into housing 38 in a carrier tube which is removed to facilitate loading all pigs into housing 38. The spine 44 keeps the necessary spacing available so that jam-ups do not occur. The unit can be serviced subsea by an ROV and can be refilled. It can also be set up and removed by an ROV. Cap 50 and valve 54 serve as the required twin isolation devices to isolate the wellbore from the surface.

The preceding description of the preferred embodiment is illustrative and by no way limits the scope of the present invention as defined in the claims which appear below.

What is claimed is:

1. A pig launching apparatus comprising:
   a housing;
   a plurality of pigs initially attached to each other for placement in said housing; and
   a separator device to release one pig for launching.

2. The apparatus of claim 1, wherein:
   said pigs are attached to each other at a predetermined distance.

3. The apparatus of claim 2, wherein:
   said housing is configured to stop the advancement of lowermost pig at a location where said separation device can separate one pig from another.

4. The apparatus of claim 3, wherein:
   said configuration of said housing comprises a taper.

5. The apparatus of claim 4, wherein:
   said pigs are separated from each other by a member which is exposed between each pair of pigs.

6. The apparatus of claim 5, wherein:
   said separation device selectively severs said member.

7. The apparatus of claim 6, wherein:
   said separation device is operable form a closed position where it supports all unlaunched pigs followed by an open position where it allows for one pig to drop onto said taper, followed by a closed position where said member is severed behind the pig resting on said taper.

8. The apparatus of claim 7, further comprising:
   a weight on said pigs to assist them into dropping down toward said taper.

9. The apparatus of claim 8, further comprising:
   at least one connection on said housing which can be made or released with an ROV.

10. The apparatus of claim 1, wherein:
    said attachment of said pigs is accomplished by a member, a portion of which is exposed between said pigs.

11. The apparatus of claim 10, wherein:
    said member is aligned with said separation device after said separation device is retracted which allows said pigs to advance in tandem by a predetermined amount.

12. The apparatus of claim 11, wherein:
    said separation device shears said member above the lowermost pig to allow said lowermost pig to be launched.

13. The apparatus of claim 12, further comprising:
    a taper on said housing to stop the lowermost pig with said member aligned with said separation device.

14. A pig launching apparatus, comprising:
    a. a housing;
    b. a plurality of unidirectional pigs attached to each other, said pigs being insertable in said housing for launching one at a time; and
    c. a separating device capable of separating one of said pigs from the other of said pigs, wherein said separating device functions as a pressure isolation valve.

15. The apparatus of claim 14, wherein:
    said separation device is capable of selectively breaking the attachment between two pigs.

16. The apparatus of claim 14 further comprising:
    a cartridge to support said pigs which can be inserted by an ROV into said housing to load said pigs therein.

\* \* \* \* \*